(12) United States Patent
Gehrig et al.

(10) Patent No.: US 8,141,799 B2
(45) Date of Patent: Mar. 27, 2012

(54) PROCESS FOR WHOLEGRAIN-CONDITIONING OF BREWER'S CEREAL GRAINS USED IN BEER PRODUCTION

(75) Inventors: Klaus Gehrig, Steinheim-Höpfigheim (DE); Hans-Jörg Menger, Reilingen (DE); Urs Keller, Seuzach (CH)

(73) Assignee: Buehler AG, Uzwil (CH)

( * ) Notice: Subject to any disclaimer, the term of this patent is extended or adjusted under 35 U.S.C. 154(b) by 202 days.

(21) Appl. No.: 12/300,083

(22) PCT Filed: Oct. 9, 2006

(86) PCT No.: PCT/CH2006/000552
§ 371 (c)(1),
(2), (4) Date: Nov. 7, 2008

(87) PCT Pub. No.: WO2007/140630
PCT Pub. Date: Dec. 13, 2007

(65) Prior Publication Data
US 2009/0117243 A1    May 7, 2009

(30) Foreign Application Priority Data
Jun. 9, 2006  (DE) .......................... 10 2006 021 777

(51) Int. Cl.
*B02C 19/00* (2006.01)

(52) U.S. Cl. ............................................. 241/8; 241/13
(58) Field of Classification Search ................. 241/7–13
See application file for complete search history.

(56) References Cited

U.S. PATENT DOCUMENTS

| | | | |
|---|---|---|---|
| 4,165,388 A | | 8/1979 | Witt |
| 4,255,456 A | * | 3/1981 | Arendt ............................ 426/64 |
| 4,504,514 A | * | 3/1985 | Kudo et al. ................... 426/634 |
| 6,613,371 B2 | * | 9/2003 | Delrue et al. ................. 426/511 |

FOREIGN PATENT DOCUMENTS

| | | |
|---|---|---|
| DE | 440 481 | 2/1927 |
| DE | 71 06 561 | 7/1971 |
| DE | 28 44 827 | 5/1980 |
| DE | 44 40 481 | 5/1998 |
| DE | 197 40 209 C 1 | 8/1998 |
| GB | 1 403 391 | 8/1975 |
| GB | 2 009 586 | 6/1979 |
| GB | 2 294 943 | 5/1998 |
| JP | 62181750 | * 8/1987 |

* cited by examiner

*Primary Examiner* — Mark Rosenbaum
(74) *Attorney, Agent, or Firm* — Greenblum & Bernstein, P.L.C.

(57) ABSTRACT

The invention relates to a process for whole-grain conditioning, in particular of native and malted brewing cereals. To improve the mashing process and to increase the number of brews and product quality, the brewing cereals are conditioned and subsequently fed to a hulling and/or mechanical comminution process.

15 Claims, No Drawings

PROCESS FOR WHOLEGRAIN-CONDITIONING OF BREWER'S CEREAL GRAINS USED IN BEER PRODUCTION

CROSS-REFERENCE TO RELATED APPLICATIONS

The present application is a U.S. National Stage of International Patent Application No. PCT/CH2006/000552 filed Oct. 9, 2006, and claims priority under 35 U.S.C. §119 of German Patent Application No. 10 2006 021 777.2 filed Jun. 9, 2006. Moreover, the disclosure of International Patent Application No. PCT/CH2006/000552 is expressly incorporated by reference herein in its entirety.

BACKGROUND OF THE INVENTION

1. Field of the Invention

The invention relates to a process for whole grain conditioning, especially of brewer's grains, such as malted barley, and the processing of these whole grain-conditioned cereal grains in the brewing technology.

2. Discussion of Background Information

Brewer's grains are mechanically broken up, e.g. by crushing in roller, hammer or corundum-disk mills or in rotor-stator systems, prior to further processing in the brewing process. Where roller mills are used, it is known in the prior art to wet the brewer's grains in conditioning screw conveyors to a max. of 2% moisture content to improve the milling result; while in so-called "soft conditioning" mills, a water component of up to 16% is introduced to the malt in a so-called "softening shaft." In both systems the holding time of the malt in the wetting zone is somewhere around 60 sec. This holding time is not sufficient to allow the malt to fully absorb the water, and at least part of the introduced water is left still clinging to the husk in its free state. Because of this short holding time, and also the naturally occurring dissimilar grain sizes of the cereal grain, a homogenous water uptake in the charge is not ensured.

As the proportion of introduced water increases, there is an increased danger of the rollers of the mills sticking and/or of problems arising in connection with hygiene.

In the subsequent mashing process, there takes place the enzymatic conversion of water-insoluble, large molecular weight constituents such as starches and proteins to smaller molecular weight, water-soluble substances, e.g. sugar and amino acids. In order to convert and extract these from the cereal grains, the mechanical preparation of the brewer's grains has to have been done sufficiently.

In the subsequent lautering process, the resulting solution (mash) is separated into the liquid phase (wort) and the solid substances (draff).

In the brewing technology generally a lauter tun or a mash filter is used for the separation of solid/liquid.

In the lauter tun, the solid, water-insoluble parts of the cereal grain, the husks, form a filter layer, through which the liquid (wort) is drawn downwards and filtered. If due to insufficient elasticity the husks and germ are broken up into too small a size in the coarse grinding, then firstly, an increased dissolution can lead to unwanted constituents such as polyphenols, lipids, etc. getting into the wort, and furthermore it results in a pronounced negative effect on the structure of the filter layer, leading to a slowing down of the lautering of the wort.

In the mash filter, the effect that unbroken whole husks have on the speed of lautering is of little importance due to the low height of the filter layer.

In DE-A-4440481 the suggestion was therefore made to first wet the malt, and then subject it to a pressure treatment in the milling gap, and also to separate the husks and endosperm by sieving. For this the malt mill used is fitted with at least one sieve. The separated husks are then subjected to an impact treatment so that any extract still adhering to them can be removed.

By impacting, not only can a gain in extract be obtained, it also increases the volume of the husk fraction. This increased fraction produces an optimized filter bed in the lauter tun which in turn ensures an improved lautering; or conversely it is possible to use a smaller portion of the husks as filter material, by which the possible entry of polyphenols is reduced.

Also known are a coarse grinding mill for malt with a continuous monitoring of the grinding (DE-A-10218424), a wet coarse grinding (DE-A-10255504 among others), an enclosed, airless coarse grinding (DE-A-19740036), or an extrusion of malt grist (DE-A-3212390).

SUMMARY OF THE INVENTION

The invention is directed to a process for whole grain conditioning of brewer's grain used in beer production which improves the standard of the wetting of the brewer's grain, as preparation for the coarse grinding process, by a homogenous wetting of each individual grain of up to 20% water content. Without free surface water, a very good tender crumbliness of the endosperm is attained and, at the same time, the elasticity of husks and germ is increased to such an extent that the husks and germ emerge from the coarse grinding process almost without any mechanical damage. Thus, the subsequent stages in the brewing process, such as the mashing, the lautering, the boiling of the wort and the fermentation, can be configured with optimal raw material and process parameters.

The invention is directed to a process for whole grain-conditioning of cereal grains. The process includes homogenously wetting of the cereal grains for up to 20% effective moisture content, and resting the wet cereal grains in a resting phase, thereby forming whole grain-conditioned grains. Further, the process includes at least one of a subsequent dry milling and wet milling of the whole grain-conditioned grains.

According to a features of the invention, the cereal grains can include brewer's grains for beer production, and the brewer's grains may include at least one of virgin and malted brewer's grains. Moreover, the brewer's grains can include malted barley, and the brewer's grain may be shelled prior to wetting.

In accordance with another feature, the wetting and the resting may be carried out in at least one stage. Further, the wetting and the resting are carried out in two stages.

Moreover, the at least one of a subsequent dry milling and wet milling of the whole grain-conditioned grains can include twice crushing the whole grain-conditioned grain without an intermediate sifting.

According to another feature of the present invention, a time period for the resting phase can be a maximum of 30 minutes per stage.

In accordance with the process, the wetting may include moistening the brewer's grain slowly with moist air. The process can also include varying a relative humidity of the moist air.

The invention is directed to a process for conditioning brewer's grains for beer production. The process includes homogenously wetting, in at least one stage, each of the brewer's grains for up to a 20% water content, and mechanically crushing the wetted brewer's grains with at least one of a dry mill and a wet mill.

In accordance with features of the invention, the at least one stage may include a single stage and the homogenously wetting can include wetting each of the brewer's grains with moist air.

According to another feature of the instant invention, the at least one stage can include two stages and the homogenously wetting may include a pre-wetting in a first stage and a second wetting in a second stage. The pre-wetting can include wetting the brewer's grains with a quantity of water of 1-3%. Further, the first stage further may include a resting phase following the pre-wetting. Further still, the second state may include a resting phase following the second wetting.

The invention is directed to a process for conditioning brewer's grains for beer production. The process includes resting, in a resting phase, brewer's grains having up to a 20% water content, and crushing the brewer's grains following the resting phase with at least one of a dry mill and a wet mill.

Accordance to another feature, between the resting and the crushing, the process can include a wetting of the brewer's grains.

In accordance with still yet another feature of the present invention, prior to the resting, the brewer's grains can be one of: wetted with moist air or pre-wetted with a quantity of water in an amount of 1-3%.

DETAILED DESCRIPTION OF THE INVENTION

The copious bulk of the coarse meal produced by the inventive process allows an about 10 to 15% higher volume throughput in the solid/liquid separation stage of the process as compared to coarse meal produced by the described methods of prior art, which means shorter cycle times. A further technological advantage results from the great number of germs retained whole and therefore fully separable, if required, as this means the harmful constituents in the germ, such as lipids and others, are less likely to get extracted in the mash.

If one desires to completely eliminate the extraction of these unwanted constituents, the high portion of whole germs allows a fractioning of the coarse meal into husks, germ and endosperm by the known mechanical processes, where all or some portion of the husks can be fed back into the process at a later stage. If the unfractioned coarse meal is mashed in, then at the time of the mashing in one can already observe how the germs, kept unbroken, swim on the mash as a surface layer and can be separated from there.

A further process advantage due to the optimized homogenous wetting of the endosperm is an accelerated reaction kinetics in the enzymatic metabolism during the mashing process.

The wetting of the brewer's grain according to the invention is carried out in at least one stage, by using moist air, or in two stages by a pre-wetting with small quantities of water of 1-3%, and, after letting it stand for a while (resting phase), a second wetting followed, where needed, a second resting phase, until the desired final humidity is achieved. By the pre-wetting and the resting phase, it is ensured that the entire quantity of water is taken up by the husks and their permeability is decisively increased for the second wetting. In this manner, in the second wetting the quantities of water necessary for the required tender crumbliness of the endosperm and also for the required elasticity of husk and germ can be very rapidly taken up by the grain, so that no free surface water, which would have a negative effect on the process, is left remaining.

It is also possible to wet the cereal grains by air-moistening, i.e., by a variable relative humidity of the air, where the relative (initial) humidity of the air should be at least 95%.

The brewer's grains which are optimally prepared in this way for the mechanical crushing process are then led to a mechanical crushing. This can be done using the mills known from prior art in the brewing technology, and here the whole grain-conditioned brewer's grains can be either dry-milled or wet-milled.

The brewer's grains wetted by the inventive process can, however, also be crushed and mashed in-line, using dry crushing mills with high throughput rates which are specially adapted to the requirements of this malt.

An additional advantage of the inventive process in the milling of the whole grain-conditioned malt lies in the field of explosion protection. In this regard, the degree of wetting of the malt markedly reduces the risk of a dust explosion and therefore it is possible to use roller mills as found in bread grain mills.

As a result it should be possible to achieve an increase in the number of brews to about 20.

The invention claimed is:

1. A process for whole grain-conditioning of brewer's grains for beer production, comprising:
   homogenous wetting of the brewer's grains for up to 20% effective moisture content;
   resting the wet brewer's grains in a resting phase for more than 60 seconds, thereby forming whole grain-conditioned grains; and
   at least one of a subsequent dry milling and wet milling the whole grain-conditioned grains,
   wherein a time period for the resting phase is a maximum of 30 minutes per stage.

2. The process in accordance with claim 1, wherein the brewer's grains comprise at least one of virgin and malted brewer's grains.

3. The process in accordance with claim 1, wherein the brewer's grains comprise malted barley.

4. The process in accordance with claim 1, wherein the brewer's grain is shelled prior to wetting.

5. The process in accordance with claim 1, wherein the wetting and the resting are carried out in at least one stage.

6. The process in accordance with claim 5, wherein the wetting and the resting are carried out in two stages.

7. The process in accordance with claim 1, wherein the at least one of a subsequent dry milling and wet milling of the whole grain-conditioned grains comprises twice crushing the whole grain-conditioned grain without an intermediate sifting.

8. The process in accordance with claim 1, wherein the wetting comprises moistening the brewer's grain slowly with moist air.

9. The process in accordance with claim 8, further comprising varying a relative humidity of the moist air.

10. A process for conditioning brewer's grains for beer production, comprising:
    homogenously wetting with moist air, in at least one stage, each of the brewer's grains for up to a 20% water content; and
    mechanically crushing the wetted brewer's grains with at least one of a dry mill and a wet mill, wherein the at least one stage comprises two stages and the homogenously wetting comprises a pre-wetting in a first stage and a second wetting in a second stage.

11. The process in accordance with claim 10, wherein the pre-wetting comprises wetting the brewer's grains with a quantity of water of 1-3%.

12. The process in accordance with claim 11, wherein the first stage further comprises a resting phase following the pre-wetting.

13. The process in accordance with claim 10, wherein the second state further comprises a resting phase following the second wetting.

14. A process for conditioning brewer's grains for beer production, comprising:
 resting, in a resting phase for more than 60 seconds, brewer's grains having up to a 20% water content; and
 crushing the brewer's grains following the resting phase with at least one of a dry mill and a wet mill,
 wherein, between the resting and the crushing, the process further comprises a wetting of the brewer's grains.

15. The process in accordance with claim 14, wherein, prior to the resting, the brewer's grains are one of: wetted with moist air or pre-wetted with a quantity of water in an amount of 1-3%.

* * * * *